G. DOWLING.
Dividers.
No. 65,654.
Patented June 11, 1867.
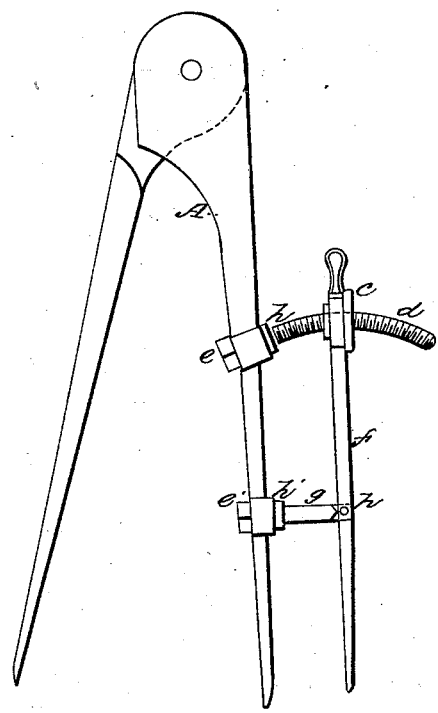

United States Patent Office.

GEORGE DOWLING, OF FAIR HAVEN, CONNECTICUT.

Letters Patent No. 65,654, dated June 11, 1867.

---

IMPROVEMENT IN COMPASSES USED IN CAULKING SEAMS.

---

The Schedule referred to in these Letters Patent and making part of the same.

---

TO ALL WHOM IT MAY CONCERN:

Be it known that I, GEORGE DOWLING, of Fair Haven, in the county of New Haven, and State of Connecticut, have invented a new and improved Compass and Caulking Seam Gauge; and I do hereby declare that the following is a full, clear, and exact description thereof, which will enable those skilled in the art to make and use the same, reference being had to the accompanying drawing, forming part of this specification.

The drawing represents a side elevation of this invention.

This invention refers to an implement which is intended to facilitate the operation of determinnig the width of a caulking seam throughout the whole length of a ship, and which enables a ship-carpenter to make accurate work without being compelled to have recourse to his rule at short intervals, or to trust to his eyes.

My implement consists of a pair of compasses, A, to which the gauge $f$ is attached. This gauge is supported by the arm $g$, to which it is connected by a pivot, $p$, and it is adjusted by a curved bolt, $d$, and nut, $e$. The bolt $d$ is secured in one of the legs of the compass A by means of a shoulder, $h$, and nut, $e$, which draws said shoulder up tight against a corresponding shoulder on the leg. The arm $g$ is also fastened to the same leg by a nut, $e'$, and shoulder, $h'$, as clearly shown in the drawing.

By means of the nut $e$ the gauge $f$ can be adjusted at any desired distance from the leg of the compass, and by setting the gauge to the width required the carpenter is enabled to make a seam of uniform width without being compelled to measure at every spot. The nut or barrel $e$ may be made in two parts, connected so as to catch over the edges of the head of the leg $f$, or it may be made with a circular groove to admit a pin, which is secured in the head of the leg $f$, so as to hold said leg in position on the barrel.

What I claim as new, and desire to secure by Letters Patent, is—

In combination with the compass A, the additional or adjustable leg $f$, and adjusting arc $d$, when constructed and operating substantially as described.

GEORGE DOWLING.

Witnesses:
WILLIAM H. STOWE,
HENRY E. PARDEE.